J. FRYKBERG.
AIR TRANSMITTER.
APPLICATION FILED APR. 19, 1910.

1,000,505.

Patented Aug. 15, 1911.

WITNESSES:
H. L. Sprague
Harry W. Bowen

INVENTOR,
Jacob Frykberg,
BY
Chapin & Co.
ATTORNEY.

UNITED STATES PATENT OFFICE.

JACOB FRYKBERG, OF CHICOPEE FALLS, MASSACHUSETTS.

AIR-TRANSMITTER.

1,000,505.

Specification of Letters Patent. Patented Aug. 15, 1911.

Application filed April 19, 1910. Serial No. 556,459.

*To all whom it may concern:*

Be it known that I, JACOB FRYKBERG, a citizen of the United States of America, formerly of Tarrytown, State of New York, but now of Chicopee Falls, county of Hampden, State of Massachusetts, have invented new and useful Improvements in Air-Transmitters, of which the following is a specification.

The present invention relates to improvements in what I term an air transmitter as used in connection with motor vehicles for inflating the pneumatic tires of the wheels.

Broadly, the invention consists in attaching an annular plate member to the spokes of the wheel and engaging said plate by another annular plate of similar construction, the two plates being so constructed as to form an annular air-space between the same, the second plate being provided with means for automatically holding it against the first mentioned annular plate which is secured to the spokes of the wheel.

An object of the invention consists in providing a device to continuously transfer air under pressure from a suitable pump to, and through the air transmitted to the tire that is to be inflated, either when the motor vehicle is standing still or traveling over the roadway.

Figure 1:
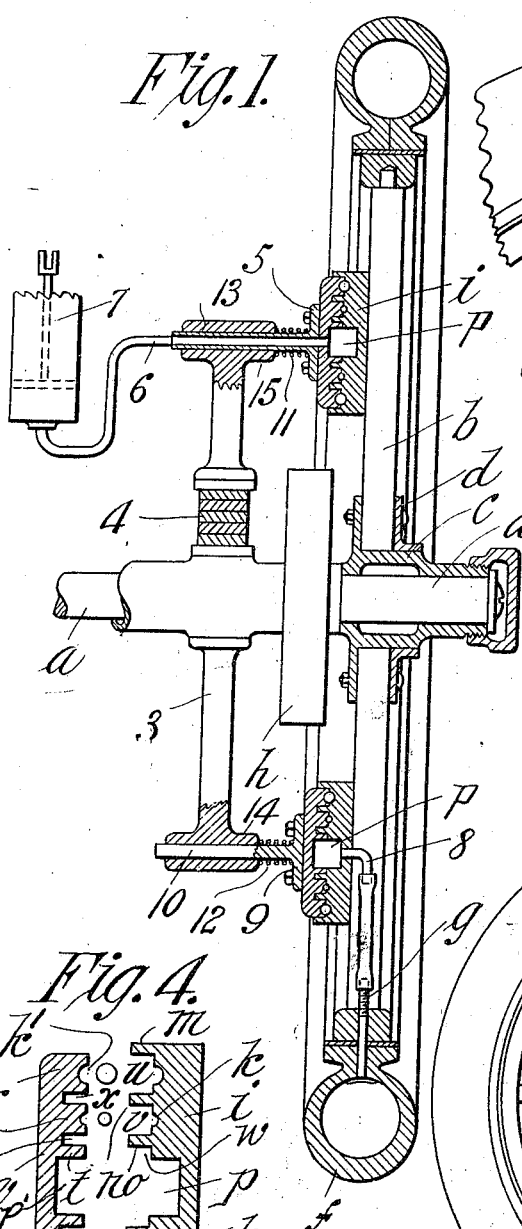
Figure 2:
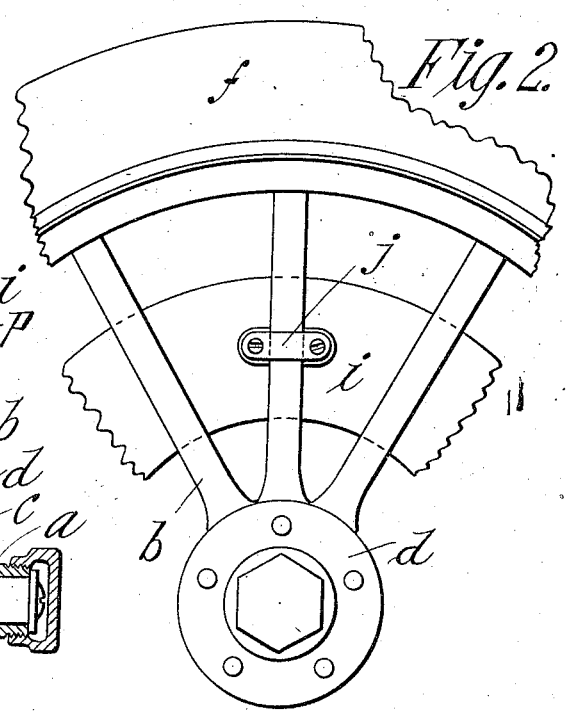
Figure 3:
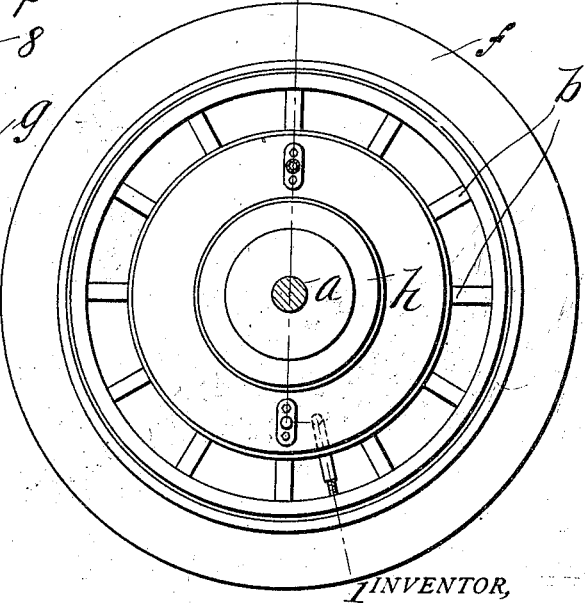
Figure 4:
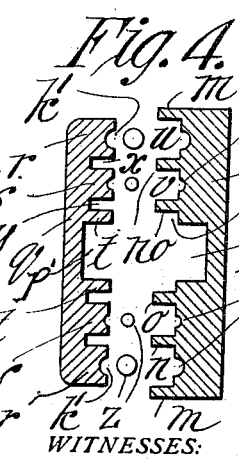

Referring to the drawings forming part of this application,—Figure 1 is a vertical sectional view on the line 1—1 of Fig. 3 showing the two annular rings in place as used. Fig. 2 is a partial side elevation of one of the vehicle wheels showing the manner of attaching one of the annular plates to the spokes thereof. Fig. 3 is a side elevation looking from the left of Fig. 1 and showing the manner of attaching the other annular member to the chassis part of the vehicle. Fig. 4 is a detail, sectional view of the annular plate members in separated relation, and indicating the rib and ball-race construction for forming an air-tight joint between the two annular members.

Referring to the drawings in detail, $a$ indicates the axle part of the vehicle; $b$ the spokes of the wheel that are secured to the hub member $c$ by means of the usual clamping plate $d$; $f$ a pneumatic tire, of any of the well known makes, which is provided with the usual inflation valve-stem designated at $g$.

Secured to the spokes $b$ of the wheel, and outside of the brake-drum $h$ is an annular plate member $i$.

$j$ designates suitable clips for securing the annular member to the spokes of the wheel. The annular plate member $i$ is provided on its inner surface with ball-races $k$ and annular projecting ribs $m$, $n$, and $o$. Intermediate of the rib $o$ is an enlarged annular groove $p$. Engaging the annular plate member $i$ is a second annular member $q$ which is provided with projections $r$, $s$, and $t$ which engage or fit into the annular grooves $u$ and $v$, and the shoulder $w$ in the annular plate member $i$. The annular member $q$ is also provided with grooves $x$ and $y$ which receive the annular ribs $n$ and $o$ of the plate member $i$.

$z$ designates anti-friction balls which engage the ball-races $k$ of the annular plate member $i$ and correspondingly shaped races $k^1$ in the member $q$, whereby the friction between the two members is greatly reduced during the rotation of the wheel. The annular member $q$ is also provided with an enlarged groove $p^1$ which registers with the groove $p$ in the annular member $i$.

In order to hold the annular member $q$ at all times in engagement with the annular plate member $i$, two plates are secured to the member $q$ and are provided with inwardly projecting arms which pass through openings in the castings 3 that is attached to the springs 4 of the vehicle chassis. The plate 5, which is located above the brake-drum $h$ is provided with an opening therethrough for receiving a pipe 6 that is connected to a suitable air compression pump 7. This pipe terminates in the annular registering grooves $p$ and $p^1$ whereby the air under pressure from the pump 7 can readily pass into this enlarged annular passage-way and from there through the short pipe connection 8 which leads to the valve-stem $g$ of the tire $f$. The lower plate 9, is provided with a solid stem portion 10 which projects through an opening in the casting 3, and located on the stems which project from the annular plate $q$ are springs 11 and 12 which are normally under compression and encircle the stems 10 and 13. These springs are located between the plates 5 and 9 and the portions 14 and 15 of the part 3.

From this construction, it will be seen that the springs always force the annular member $q$ outward toward the fixed annular member $i$ thus preventing the escape of the compressed air from the groove $p$ during the running of the wheel. It will therefore be seen from this construction that air, under pressure, can at all times be forced into the tires $f$ from the pump 7 through the air transmitter device which consists mainly of the two annular grooved members $i$ and $q$.

What I claim, is:—

In an air-transmitting device, the combination with the vehicle wheel provided with a pneumatic tire, a valve-stem connected thereto, an annular member provided with an annular groove secured to the wheel and adapted to rotate therewith, a pipe connection leading from the valve-stem to a groove in the annular member, a second annular member secured to the stationary part of the vehicle and having an annular groove that is adapted to register with the annular groove of the first member carried by the wheel, the two annular members being provided with ribbed and grooved constructions forming an air-tight joint therebetween, means for forcing air into the registering grooves under pressure, and a pipe connection leading from the registering grooves to the valve-stem, whereby the tire is inflated during the rotation of the wheel.

JACOB FRYKBERG.

Witnesses:
W. C. ALDRIDGE,
WM. RIXMANN.